(12) United States Patent
Kim (10) Patent No.: US 12,110,939 B2
(45) Date of Patent: Oct. 8, 2024

(54) ANTI-VIBRATION DEVICE

(71) Applicant: LS ELECTRIC CO., LTD., Anyang-Si (KR)

(72) Inventor: Kyung Min Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 38 days.

(21) Appl. No.: 17/802,056

(22) PCT Filed: Jan. 12, 2021

(86) PCT No.: PCT/KR2021/000389
§ 371 (c)(1),
(2) Date: Aug. 24, 2022

(87) PCT Pub. No.: WO2021/172740
PCT Pub. Date: Feb. 9, 2021

(65) Prior Publication Data
US 2023/0093089 A1  Mar. 23, 2023

(30) Foreign Application Priority Data

Feb. 24, 2020 (KR) .................. 10-2020-0022330

(51) Int. Cl.
*F16F 15/04* (2006.01)
*H02M 7/44* (2006.01)

(52) U.S. Cl.
CPC .............. *F16F 15/04* (2013.01); *H02M 7/44* (2013.01)

(58) Field of Classification Search
CPC .............. F16F 7/00; F16F 15/04; H02M 7/44
See application file for complete search history.

(56) References Cited

U.S. PATENT DOCUMENTS 2,540,130 A * 2/1951 Lee .................... F16F 13/24
                                                  267/140.3
2,900,162 A * 8/1959 Crede .................. F16F 7/09
                                                  267/140.13
(Continued)

FOREIGN PATENT DOCUMENTS

CN  201269281 Y  7/2009
CN  201461844 U  5/2010
(Continued)

OTHER PUBLICATIONS

International Search Report for related International Application No. PCT/KR2021/000389; report dated Sep. 2, 2021; (5 pages).

(Continued)

*Primary Examiner* — Eret C Mcnichols
(74) *Attorney, Agent, or Firm* — K&L Gates LLP (57) ABSTRACT

Disclosed is an anti-vibration device. An anti-vibration device according to the embodiment of the present disclosure reduces vibration between an object and an installation surface on which the object is installed, and the anti-vibration device includes a first elastic member, a first support member disposed to cover the first elastic member and fastened to the first elastic member, a second elastic member disposed on an upper portion of the first support member, and a second support member disposed to cover the second elastic member and fastened to the first support member.

8 Claims, 5 Drawing Sheets

(56) References Cited

U.S. PATENT DOCUMENTS

| | | | | |
|---|---|---|---|---|
| 3,323,764 | A * | 6/1967 | Johnson | F16F 15/04 267/152 |
| 4,842,258 | A * | 6/1989 | Misaka | F16F 13/10 267/140.3 |
| 4,971,496 | A * | 11/1990 | Scholz | B64C 1/40 411/105 |
| 5,096,153 | A * | 3/1992 | Seeley | F16F 3/0873 267/141.1 |
| 5,116,030 | A * | 5/1992 | Nowak | F16F 3/0876 267/140.4 |
| 5,651,535 | A * | 7/1997 | David | F16F 1/3732 267/153 |
| 5,799,923 | A * | 9/1998 | Carr | F16F 1/3732 248/638 |
| 5,927,698 | A * | 7/1999 | Miyoshi | F16F 1/376 267/140.13 |
| 6,565,061 | B1 * | 5/2003 | Petersen | F16F 7/00 248/562 |
| 7,140,603 | B2 * | 11/2006 | Maeno | B60K 5/1208 267/140.13 |
| 7,316,389 | B2 * | 1/2008 | Rawson | F16F 1/3732 267/141.5 |
| 7,584,944 | B2 * | 9/2009 | Goudie | F16F 13/1418 267/293 |
| 8,485,491 | B2 * | 7/2013 | Visage | F16F 1/3876 248/633 |
| 8,511,637 | B2 * | 8/2013 | Mitsch | F01D 25/28 248/677 |
| 10,871,198 | B2 * | 12/2020 | Caron-L'Ecuyer | F16F 1/3732 |
| 2002/0145241 | A1 * | 10/2002 | Rawson | F16F 1/3732 267/140.13 |
| 2015/0211592 | A1 * | 7/2015 | Rawson | F16F 3/0873 267/141.1 |

FOREIGN PATENT DOCUMENTS

| | | | |
|---|---|---|---|
| CN | 102506121 A * | 6/2012 | |
| CN | 102506121 B | 2/2014 | |
| JP | 3961375 B2 | 5/2007 | |
| JP | 5355901 B | 9/2013 | |
| KR | 200382899 Y1 | 4/2005 | |
| KR | 1020150112725 A | 10/2015 | |
| WO | WO-0227209 A2 * | 4/2002 | F16F 7/00 |

OTHER PUBLICATIONS

Written Opinion for related International Application No. PCT/KR2021/000389; report dated Sep. 2, 2021; (8 pages).
Supplementary European Search Report for related European Patent Application No. 21760530.2; action dated Mar. 15, 2024; (8 pages).

* cited by examiner

ANTI-VIBRATION DEVICE

CROSS-REFERENCE TO RELATED APPLICATIONS

This application is a National Stage of International Application No. PCT/KR2021/000389 filed on Jan. 12, 2021, claims priority to and the benefit of Korean Patent Application No. 10-2020-0022330, filed on Feb. 24, 2020, the disclosure of which is incorporated herein by reference in its entirety.

FIELD

The present disclosure relates to an anti-vibration device, and more particularly, to an anti-vibration device that reduces vibration between an object and an installation surface on which the object is installed.

BACKGROUND

An inverter refers to a device that converts alternating current into direct current. The inverter is used for an industrial electronic device and needs to be certified for various vibration specifications. The types of specifications related to vibration include the specifications related to high efficiency, the specification related to shipping, and the like.

Recently, the inverter tends to have a shape having a large height and having a length in a transverse direction shorter than a length in a longitudinal direction. For this reason, there is a problem in that the inverter is relatively vulnerable to vibration in the transverse direction. In addition, because various vibration characteristics occur as sizes of products are increased, the inverter needs to be certified for three axes (X, Y, and Z). For this reason, it is difficult to satisfy the certification requirements related to vibration.

In the related art, there have been attempts to improve the shape of the inverter by increasing a thickness of a base frame or decreasing a center of gravity to reduce vibration of the inverter. However, there is a limitation in improving the inverter because of interference between components during a process of designing the inverter.

(Patent Document 1) Korean Utility Model Application Laid-Open No. 20-2018-0000624 "VERTICAL VIBRATION PROOF APPARATUS FOR DECK PLATE"

SUMMARY

The present disclosure has been made in an effort to solve the above-mentioned problems in the related art, and an object of the present disclosure is to provide an anti-vibration device disposed between an object and an installation surface when the object such as an inverter is installed on the installation surface, thereby reducing vibration.

Another object of the present disclosure is to provide an anti-vibration device that provides improved efficiency in reducing vibration.

An aspect of the present disclosure provides an anti-vibration device, which reduces vibration between an object and an installation surface on which the object is installed, the anti-vibration device including: a first elastic member; a first support member disposed to cover the first elastic member and fastened to the first elastic member; a second elastic member disposed on an upper portion of the first support member; and a second support member disposed to cover the second elastic member and fastened to the first support member.

In this case, the first support member may include: a first cover plate configured to support an upper surface of the first elastic member and fastened to the first elastic member; a first sidewall connected to a lower portion of the first cover plate and configured to allow the first elastic member to be spaced apart from the installation surface at a predetermined height, the first sidewall being configured to cover a lateral surface of the first elastic member; and a fastening plate connected outward from a lower end of the first sidewall so as to be fastened to the installation surface.

In addition, the second support member may include: a second cover plate configured to support an upper surface of the second elastic member; and a second sidewall connected to a lower portion of the second cover plate and configured to cover a lateral surface of the second elastic member.

In addition, the first and second cover plates may each have a circular shape, and the first and second sidewalls may each have a cylindrical shape.

In addition, the fastening plate may be connected to two opposite sides of the first sidewall and formed to be vertically symmetric outward in a radial direction.

In addition, the fastening plate may be connected to the first sidewall while defining a triangular shape outward in a radial direction.

In addition, the first cover plate, the first elastic member, the second cover plate, and the second elastic member may each have a through-hole provided in a central portion thereof, the anti-vibration device may further include a first nut inserted into the through-hole of the first elastic member and having a flange configured to support a lower surface of the first elastic member, and the second cover plate, the second elastic member, the first cover plate, and the first elastic member may be fastened to one another by a bolt coupled to the first nut while penetrating the second cover plate, the second elastic member, the first cover plate, and the first elastic member.

In addition, the anti-vibration device may further include a second nut provided between the first cover plate and the second cover plate, disposed in the through-hole of the second elastic member, and fastened to the bolt.

In addition, only a part of an outer surface of the first elastic member may be in contact with the first support member such that a space is formed between the first elastic member and the first support member.

In addition, only a part of an outer surface of the second elastic member may be in contact with the first and second support members such that a space is formed between the second elastic member and one of or both the first and second support members.

One of or both the first and second elastic members may include a recessed portion recessed inward.

According to the embodiment of the present disclosure, the anti-vibration device disposed between the object and the installation surface may effectively reduce vibration in a state in which the anti-vibration device, together with the object, is fixed on the installation surface.

In addition, according to the embodiment of the present disclosure, it is possible to improve efficiency in reducing vibration by means of a structure in which elastic members are stacked.

DETAILED DESCRIPTION

Hereinafter, an embodiment of the present disclosure will be described in detail with reference to the accompanying drawings so that those skilled in the technical field to which the present disclosure pertains may easily carry out the embodiment. The present disclosure may be implemented in various different ways, and is not limited to the embodiments described herein. In the drawings, a part irrelevant to the description will be omitted to clearly describe the present disclosure, and the same or similar constituent elements will be designated by the same reference numerals throughout the specification.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

In addition, in the present specification, the spatially relative term "forward," "rearward," "upper," or "lower" may be used to describe the correlation between the constituent elements. These terms are relative terms determined based on the features illustrated in the drawings, and the positional relationship may be interpreted in a reverse manner.

In addition, unless otherwise specified, a case in which one constituent element is disposed at "a front side," "a rear side," "an upper side," or "a lower side" of another constituent element includes not only a case in which one constituent element is disposed at "the front side," "the rear side," "the upper side," or "the lower side" of another constituent element while directly adjoining another constituent element, but also a case in which a further constituent element is disposed between one constituent element and another constituent element.

Figure 1:
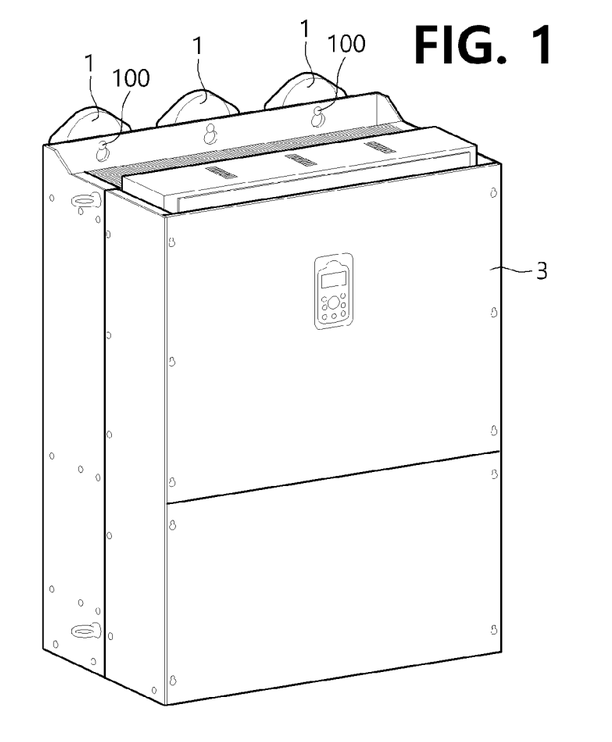
FIGS. 1 and 2 are views illustrating a state in which an anti-vibration device according to an embodiment of the present disclosure, together with an object, is fixed on an installation surface.
Figure 2:
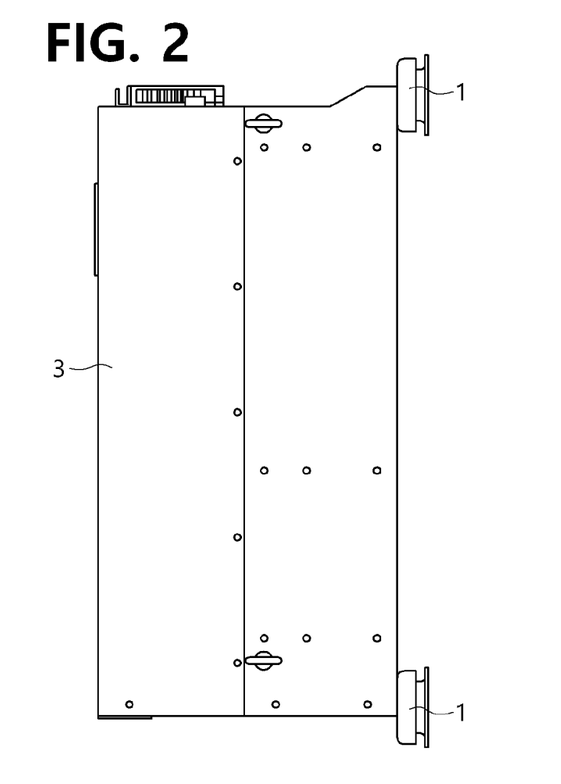

FIGS. 1 and 2 are views illustrating a state in which an anti-vibration device according to an embodiment of the present disclosure, together with an object, is fixed on an installation surface.

Referring to FIGS. 1 and 2, an anti-vibration device 1 according to an embodiment of the present disclosure refers to a device that reduces vibration between an object 3 and an installation surface on which the object 3 is installed. In this case, the object 3 may be an inverter. Meanwhile, the installation surface may be a vertical wall surface.

The anti-vibration device 1 may be fixed to the installation surface by means of a bolt (not illustrated). In addition, the object 3 may be fixed to the anti-vibration device 1 by means of bolts 100. In other words, the object 3 may be indirectly fixed to the installation surface by being fixed to the anti-vibration device 1.

Two or more anti-vibration devices 1 may be disposed between the object 3 and the installation surface. FIGS. 1 and 2 illustrate an example in which three anti-vibration devices are disposed on each of the upper and lower portions of the object 3. Of course, the arrangement position of the anti-vibration device 1 and the number of anti-vibration devices 1 are not limited by the example. The arrangement position of the anti-vibration device 1 and the number of anti-vibration devices 1 may of course be modified in accordance with the object 3 and the installation surface.

Figure 3:
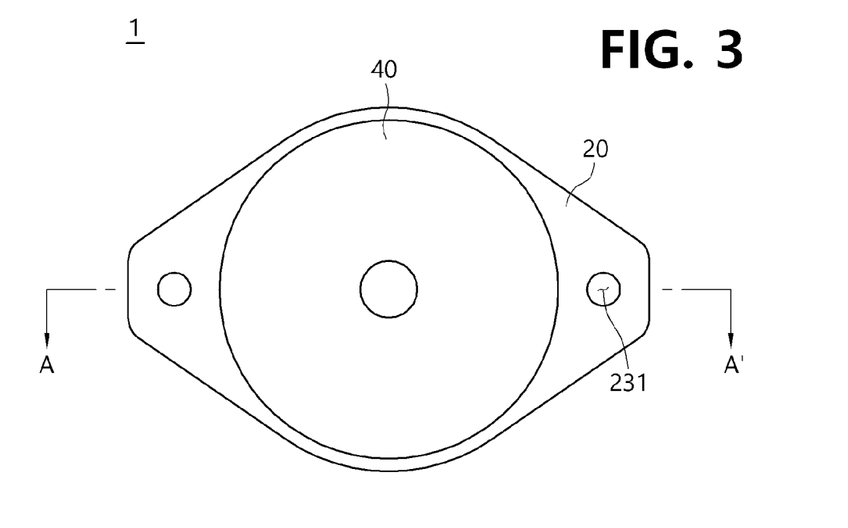
FIG. 3 is a top plan view of the anti-vibration device according to the embodiment of the present disclosure.
Figure 4:
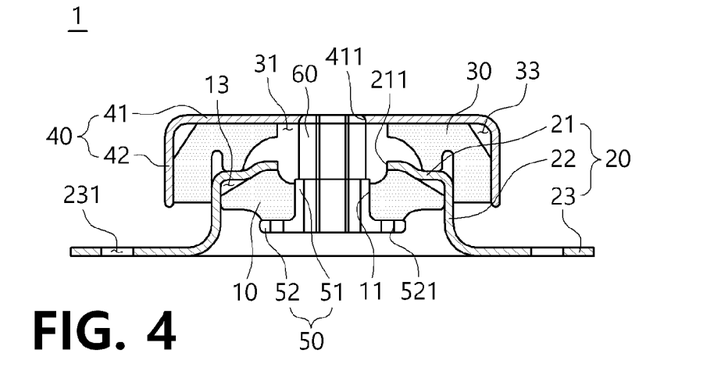
FIG. 4 is a cross-sectional view taken along line A-A' in FIG. 3.

FIG. 3 is a top plan view of the anti-vibration device according to the embodiment of the present disclosure, and FIG. 4 is a cross-sectional view taken along line A-A' in FIG. 3.

Referring to FIGS. 3 and 4, the anti-vibration device 1 according to the embodiment of the present disclosure includes a first elastic member 10, a first support member 20, a second elastic member 30, a second support member 40, a first nut 50, and a second nut 60.

The first elastic member 10 is a member configured to absorb vibration and covered by the first support member 20. In the embodiment of the present disclosure, the first elastic member 10 is fastened to the first support member 20 in a state in which the first elastic member 10 is spaced apart from the installation surface at a predetermined height.

In addition, the first elastic member 10 is provided in the form of a ring-shaped member having a through-hole 11 formed in a central portion thereof. For example, the first elastic member 10 may be made of a rubber material.

In the embodiment of the present disclosure, only a part of an outer surface of the first elastic member 10 is in contact with the first support member 20, thereby defining a space 13 between the first elastic member 10 of the first support member 20. The space 13 formed between the first elastic member 10 and the first support member 20 may accommodate the deformation of the first elastic member 10 when vibration is applied, thereby improving an effect of reducing vibration.

The first support member 20 is disposed to cover the first elastic member 10 and fastened to the first elastic member 10. The first support member 20 covers and protects the first elastic member 10 from an external environment.

The first support member 20 includes a first cover plate 21, a first sidewall 22, and a fastening plate 23. The first cover plate 21, the first sidewall 22, and the fastening plate 23 may be formed by bending a single integrated member.

The first cover plate 21 supports an upper surface of the first elastic member 10 and is a portion to which the first elastic member 10 is fastened. More specifically, the first cover plate 21 has a circular shape. A lower surface of the first cover plate 21 is disposed to adjoin the upper surface of the first elastic member 10. In addition, the upper surface of the first cover plate 21 is a contact surface that adjoins the second elastic member 30.

In addition, a through-hole 211 is formed in a central portion of the first cover plate 21. The through-hole 211 of the first cover plate 21 communicates with the through-hole 11 of the first elastic member 10.

The first sidewall 22 is connected to a lower portion of the first cover plate 21 and allows the first elastic member 10 to be spaced apart from the installation surface at a predetermined height. The first sidewall 22 covers a lateral surface of the first elastic member 10. The first sidewall 22 may have a cylindrical shape extending downward along a rim of the first cover plate 21.

The fastening plate 23 is connected outward from a lower end of the first sidewall 22. The fastening plate 23 may be connected to the lower end of the first sidewall 22 and extend outward in a radial direction. In the embodiment of the present disclosure, the fastening plate 23 is connected to two opposite sides of the first sidewall 22 and formed to be vertically symmetric outward in the radial direction. The fastening plate 23 may be configured to be fastened to the installation surface so that the anti-vibration device 1 according to the embodiment of the present disclosure may be fixed to the installation surface. To this end, the fastening plate 23 has through-holes 231 through which bolts (not illustrated) are coupled.

The second elastic member 30 is a member disposed on an upper portion of the first support member 20 and configured to absorb vibration. The second elastic member 30 is covered by the second support member 40. When the second support member 40 is fastened to the first support member 20, the second elastic member 30 may be pressed and fixed between the first support member 20 and the second support member 40.

In addition, the second elastic member 30 is provided in the form of a ring-shaped member having a through-hole 31 formed in a central portion thereof. For example, the second elastic member 30 may be made of a rubber material.

In the embodiment of the present disclosure, the second elastic member 30 has a diameter larger than a diameter of the first cover plate 21. The through-hole 31 of the second elastic member 30 communicates with the through-hole 11 of the first elastic member 10 and the through-hole 211 of the first cover plate 21.

A lower portion of the through-hole 31 of the second elastic member 30 has an inner diameter corresponding to the diameter of the first cover plate 21, such that the second elastic member 30 may be disposed such that a lower portion of the second elastic member 30 surrounds an upper end of the first sidewall 22 and the first cover plate 21. Meanwhile, the upper portion of the through-hole 31 of the second elastic member 30 may have a diameter that decreases in a direction away from the installation surface. As described above, the second elastic member 30 is disposed in the form of a cap that covers the upper portion of the first support member 20. Therefore, it is possible to provide an expanded anti-vibration area on the upper portion of the first elastic member 10 and ensure structural stability.

Only a part of the outer surface of the second elastic member 30 is in contact with the first support member 20 and the second support member 40, thereby defining a space 33 between the second elastic member 30 and one of or both the first and second support members 20 and 40. The space 33 formed between the second elastic member 30 and one of or both the first and second support members 20 and 40 may accommodate the deformation of the second elastic member 30 caused by vibration, thereby improving the effect of reducing vibration.

The second support member 40 is disposed to cover the second elastic member 30 and fastened to the first support member 20. The second support member 40 covers and protects the second elastic member 30 from an external environment.

The second support member 40 has a shape of a cap that protects the second elastic member 30. As described above, in the embodiment of the present disclosure, the second elastic member 30 is provided in the form of a cap that covers the upper portion of the first support member 20. Therefore, the second support member 40 covers a part of the upper portion of the first support member 20 while covering the second elastic member 30.

More specifically, the second support member 40 includes a second cover plate 41 and a second sidewall 42. The second cover plate 41 and the second sidewall 42 may be formed by bending a single integrated member.

The second cover plate 41 is a portion that supports an upper surface of the second elastic member 30. More specifically, the second cover plate 41 has a circular shape. A lower surface of the second cover plate 41 is disposed to adjoin the upper surface of the second elastic member 30. Meanwhile, the upper surface of the second cover plate 41 is a contact surface that is in contact with the object 3.

In addition, a through-hole 411 is formed in a central portion of the second cover plate 41. The through-hole 411 of the second cover plate 41 communicates with the through-hole 11 of the first elastic member 10, the through-hole 211 of the first support member 20, and the through-hole 31 of the second elastic member 30.

The second sidewall 42 is connected to a lower portion of the second cover plate 41 and covers a lateral surface of the second elastic member 30. The second sidewall 42 may have a cylindrical shape extending downward along a rim of the second cover plate 41.

The first nut 50 is a member fastened to a lower surface of the first elastic member 10 while supporting the lower surface of the first elastic member 10. The first nut 50 includes a nut main body 51, and a flange 52 extending outward from a lower end of the nut main body 51.

The nut main body 51 is inserted into the through-hole 11 of the first elastic member 10. In addition, the flange 52 supports the lower surface of the first elastic member 10. Meanwhile, the flange 52 may have a through-hole 521 formed in an upward/downward direction. When a bolt (not illustrated) is inserted and fastened into the first elastic member 10 through the through-hole 521 of the flange 52, such that the first elastic member 10 may be more stably fixed.

As illustrated in FIG. 1, the bolt 100 for fastening the object 3 is inserted into the anti-vibration device 1 according to the embodiment of the present disclosure, and the first nut 50 may be fastened to the bolt 100. Therefore, the first elastic member 10, the first support member 20, the second elastic member, and the second support member 40 may be fastened to one another.

The second nut 60 is provided between the first cover plate 21 and the second cover plate 41 and disposed in the through-hole 31 of the second elastic member 30. The second nut 60 is fastened to the bolt 100. The object 3 may be fixed to the installation surface as the bolt 100 is fastened to the second nut 60.

Figure 5:
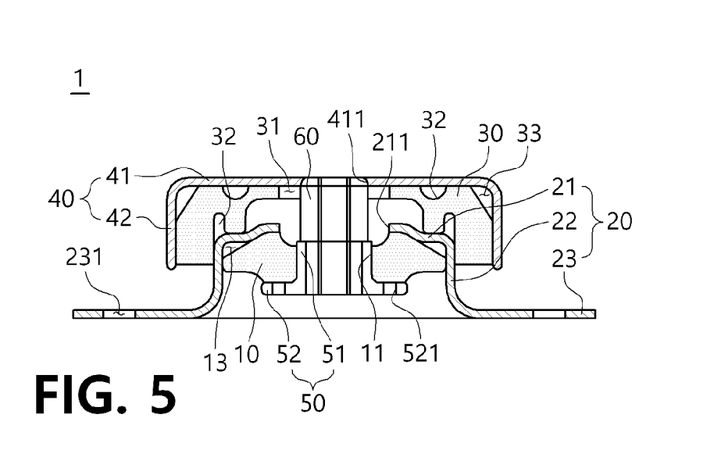
FIG. 5 is a view illustrating a modified example of the anti-vibration device according to the embodiment of the present disclosure.

Meanwhile, FIG. 5 illustrates a modified example of the anti-vibration device according to the embodiment of the present disclosure. Referring to FIG. 5, the modified example is implemented by modifying the shape of the second elastic member 30 according to the above-mentioned embodiment of the present disclosure, and all the other components are identical to those described above.

In the modified example illustrated in FIG. 5, the second elastic member 30 includes a plurality of recessed portions 32 recessed inward. The recessed portion 32 may be provided in the form of a groove or the like. The recessed portion 32 may reduce rigidity of the second elastic member 30. Meanwhile, although not illustrated in the drawings, the first elastic member 10 may have the recessed portion when it is necessary to adjust rigidity of the first elastic member 10.

Figure 6:
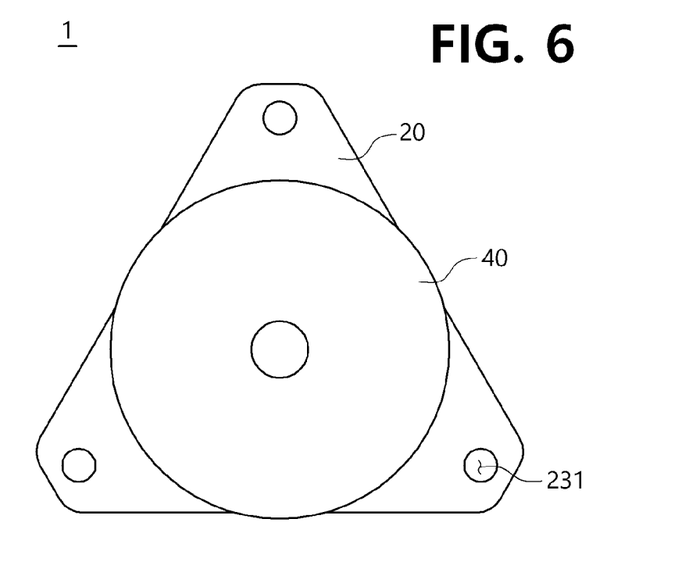
FIGS. 6 and 7 are views illustrating another modified example of the anti-vibration device according to the embodiment of the present disclosure.
Figure 7:
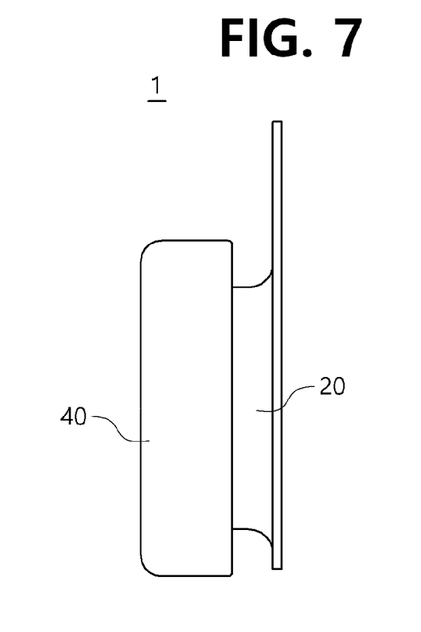

FIGS. 6 and 7 illustrate another modified example of the anti-vibration device according to the embodiment of the present disclosure. The modified example illustrated in FIGS. 6 and 7 is implemented by modifying the shape of the fastening plate 23 of the first support member 20 according to the above-mentioned embodiment of the present disclosure, and all the other components are identical to those described above.

In the modified example illustrated in FIGS. 6 and 7, the fastening plate 23 of the first support member 20 is connected to the first sidewall 22 while defining a triangular shape outward in the radial direction. More specifically, the fastening plate 23 is connected to the first sidewall 22 while defining an equilateral triangular outward in the radial direction. When the fastening plate 23 is formed as described above, it is possible to provide a more stable fixing force when the anti-vibration device 1 is installed on the fastening surface.

Meanwhile, in addition to the above-mentioned modified example, it is possible to consider a case in which the fastening plate 23 is connected to the first sidewall 22 while defining a circular flange shape or a polygonal flange shape having sides equal to or larger in number than sides of a quadrangular flange shape outward in the radial direction.

Figure 8:
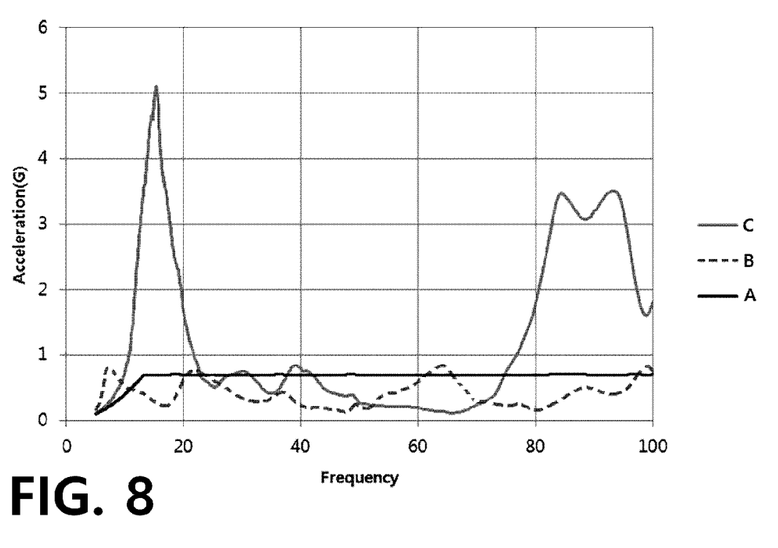
FIG. 8 is a graph illustrating an effect of the anti-vibration device according to the embodiment of the present disclosure.

FIG. 8 is a graph illustrating an effect of the anti-vibration device according to the embodiment of the present disclosure.

Referring to FIG. 8, it can be seen that an acceleration response smaller than 1 is shown at all frequencies when a predetermined oscillation load is applied (A) and when the anti-vibration device 1 according to the embodiment of the present disclosure is disposed between the object 3 and the installation surface (B). In contrast, an acceleration response exceeding the maximum 5 was observed when the object 3 is installed on the installation surface (C) in a state in which the anti-vibration device 1 according to the embodiment of the present disclosure is not disposed between the object 3 and the installation surface. Therefore, the vibration reducing performance of the anti-vibration device 1 according to the embodiment of the present disclosure may be ascertained.

In addition, a Q factor is essentially used for the certification related to shipping vibration. The Q factor is a factor that indicates the acuity of resonance. Specifically, the Q factor indicates a state of an attenuated vibrator or resonator or is used to determine a bandwidth of the resonator in accordance with a center frequency. According to the embodiment of the present disclosure, the Q factor may be less than 5.

While the embodiments of the present disclosure have been described above, the spirit of the present disclosure is not limited to the embodiments presented in the present specification, those skilled in the art, who understand the spirit of the present disclosure, may easily propose other embodiments by adding, changing, deleting constituent elements within the same spirit and scope of the present disclosure, and it can be said that the embodiments are also within the spirit and scope of the present disclosure.

The anti-vibration device according to the present disclosure may be used to reduce vibration of an inverter or the like used for an industrial electronic device.

The invention claimed is:

1. An anti-vibration device, which reduces vibration between an object and an installation surface on which the object is installed, the anti-vibration device comprising:
   a first elastic member;
   a first support member disposed to cover the first elastic member and fastened to the first elastic member;
   a second elastic member disposed on an upper portion of the first support member; and
   a second support member disposed to cover the second elastic member and fastened to the first support member,
   wherein only a part of an outer surface of the first elastic member is in contact with the first support member such that a space is formed between the first elastic member and the first support member,
   wherein the first support member comprises:
   a first cover plate configured to support an upper surface of the first elastic member and fastened to the first elastic member;
   wherein the second support member comprises:
      a second cover plate configured to support an upper surface of the second elastic member; and
      a second sidewall connected to a lower portion of the second cover plate and configured to cover a lateral surface of the second elastic member,
   wherein the first cover plate, the first elastic member, the second cover plate, and the second elastic member each have a through-hole provided in a central portion thereof, the anti-vibration device further comprises a first nut inserted into the through-hole of the first elastic member and having a flange configured to support a lower surface of the first elastic member, and the second cover plate, the second elastic member, the first cover plate, and the first elastic member are fastened to one another by a bolt coupled to the first nut while penetrating the second cover plate, the second elastic member, the first cover plate, and the first elastic member, and
   a second nut provided between the first cover plate and the second cover plate, disposed in the through-hole of the second elastic member, and fastened to the bolt.

2. The anti-vibration device of claim 1, wherein the first support member comprises:
   a first sidewall connected to a lower portion of the first cover plate and configured to allow the first elastic member to be spaced apart from the installation surface at a predetermined height, the first sidewall being configured to cover a lateral surface of the first elastic member; and
   a fastening plate connected outward from a lower end of the first sidewall so as to be fastened to the installation surface.

3. The anti-vibration device of claim 2, wherein the second support member comprises:
   a second sidewall connected to a lower portion of the second cover plate and configured to cover a lateral surface of the second elastic member.

4. The anti-vibration device of claim 3, wherein the first and second cover plates each have a circular shape, and the first and second sidewalls each have a cylindrical shape.

5. The anti-vibration device of claim 4, wherein the fastening plate is connected to two opposite sides of the first sidewall and formed to be vertically symmetric outward in a radial direction.

6. The anti-vibration device of claim 4, wherein the fastening plate is connected to the first sidewall while defining a triangular shape outward in a radial direction.

7. The anti-vibration device of claim 1, wherein only a part of an outer surface of the second elastic member is in contact with the first and second support members such that a space is formed between the second elastic member and one of or both the first and second support members.

8. The anti-vibration device of claim 1, wherein one of or both the first and second elastic members includes a recessed portion recessed inward.

\* \* \* \* \*